Sept. 30, 1952 C. F. MILLER Re. 23,554

CONTROLLER

Original Filed Feb. 28, 1948 3 Sheets-Sheet 1

INVENTOR.
Charles F. Miller
BY
Stone Pratt
his ATTORNEY

CONTROLLER

Original Filed Feb. 28, 1948 3 Sheets-Sheet 2

INVENTOR.
Charles F. Miller
BY
Stanley Ann Tim
his ATTORNEYS.

CONTROLLER

Original Filed Feb. 28, 1948 3 Sheets-Sheet 3

INVENTOR.
Charles F. Miller
BY
J. Stanley Preston
his ATTORNEY

Reissued Sept. 30, 1952 Re. 23,554

UNITED STATES PATENT OFFICE 23,554

CONTROLLER

Charles F. Miller, Philadelphia, Pa., assignor to Jacquard Knitting Machine Co., Inc., Philadelphia, Pa., a corporation of New York Original No. 2,534,724, dated December 19, 1950, Serial No. 11,969, February 28, 1948. Application for reissue April 4, 1952, Serial No. 280,560

9 Claims. (Cl. 66—155)

Figure 1:
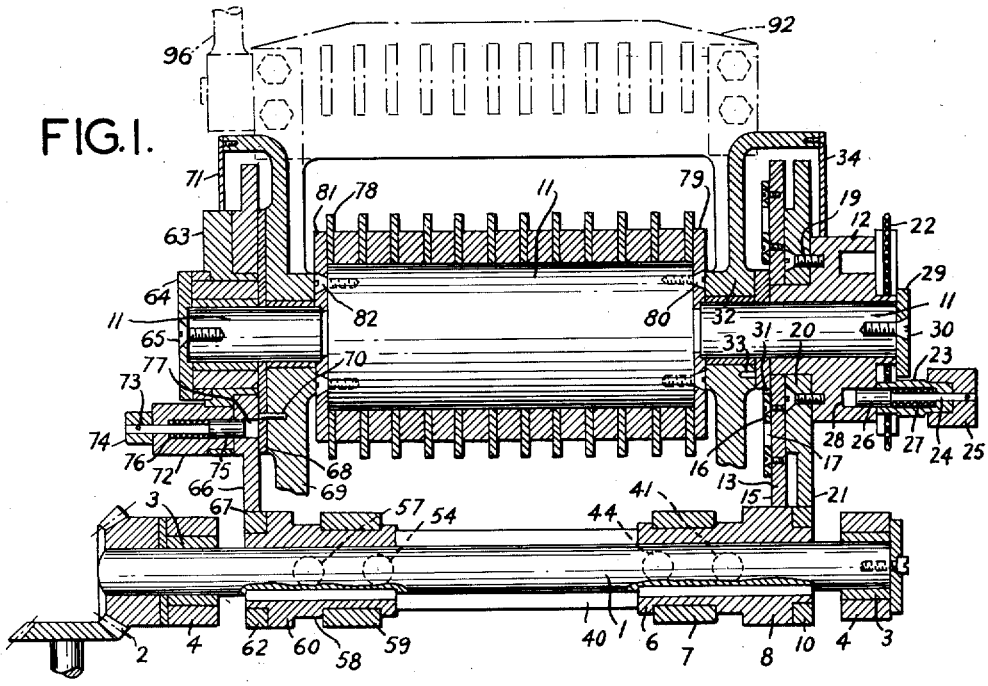

Matter enclosed in heavy brackets [ ] appears in the original patent but forms no part of this reissue specification; matter printed in italics indicates the additions made by reissue.

This invention relates to controllers employed to start, stop or modify industrial operations at intervals, and generally in a repetitive manner. For example, in certain circular knitting machines it is necessary to shift the positions of cams to discontinue or modify the action of needles, jacks, etc., from time to time, or adjust yarn changers so that certain yarns are taken out of action on occasion and from time to time certain out-of-action yarns are returned to action again, and at longer intervals, usually corresponding to the time required to knit some particular length of cloth, it is necessary to repeat the series of operational changes, whatever they may comprise. The present invention relates to controllers of the type that are adapted to bring about operational changes which, as in the case of those mentioned, need to be brought about at intervals of greater or lesser duration. It is not limited to the operations mentioned above however, and while it is particularly well suited to the control of circular knitting machines, it is not wholly limited thereto. Instead, speaking broadly, the invention is of general application to controllers of the type indicated as will become apparent from the matter hereafter.

As is well known, controllers of the type indicated have one or more patterns to directly direct the desired changes. Whatever this pattern arrangement may be however, such a controller commonly employs in addition a master control device or mechanism having its own pattern to advance the change-directing pattern or patterns whenever a change is to be made in one or more of the operations. Speaking generally, the use of a master control device or mechanism to call the change-directing pattern or patterns into action only when the need for their action arises, permits the change-directing pattern or patterns to be shorter and the whole mechanism more compact than it would be otherwise.

With such arrangements the master control device or mechanism, or some part of it, is driven continually in a fixed time relation to the operation or operations to be controlled, so that the various changes may occur at the proper times relative to those operations. Customarily at least, the master control mechanism or the part of it that is to operate continually, is driven from the power shaft of the machine to which the controller is applied. As commonly built heretofore however the master control device includes (i. e. incorporates or has associated with it) a pawl and ratchet. This has two faults that long have been recognized. First, whenever the ratchet is advanced by the pawl the momentum of the parts may cause the change-directing pattern or patterns to advance beyond their intended new positions, thereby causing imperfect operation. Second, the ratchet is free to be turned accidentally, or manually by someone unfamiliar with the effect of the action, and thereby changes made in the operations at improper times.

Speaking generally the present invention eliminates such faults by locking the master control mechanism and all its parts to the shaft or other powder device by which the controller mechanism is driven, except possibly when the master control or some part of it is deliberately unlocked from the driving mechanism or from an associated part by means of attachments provided for that purpose. Such attachments may be provided to permit the various parts of the controller and its patterns to be brought initially into the desired time relations.

Primarily this result is accomplished by eliminating all pawls and ratchets and employing instead, at the master control mechanism, constantly intermeshed toothed gearing, and preferably similarly connecting the change-directing pattern or patterns to the shaft or other power device which provides the power to advance it or them. The latter connection may be a Geneva type of movement, and where the pattern of the master control mechanism is to be advanced intermittently, the toothed gearing which connects it to its driving shaft can be a Geneva type of movement also. Where it is desired that the pattern of the master control mechanism be advanced quite slowly relative to the driving shaft, e. g. where it is desired that the intervals between its successive advances be rather long, a succession of gears, preferably a plurality of Geneva movements, can be interposed between the driving shaft and this pattern, the first being driven directly by, say, the driving shaft and the last advancing the pattern. Also where a complete cycle of the controlled operations comprises, or may require, complete cycles of a number of operations (as, for example, in the case of a circular knitting machine having a number of feeds, where a complete rotation of the cam cylinder can be regarded as a complete cycle of the operations of the machine), such a succession of gears can be used to time the advances of the pattern of the master control mechanism pattern with respect to the complete cycles; for example, one gear arranged to bring the next into action at the end of each complete cycle.

These and other matters of the invention are illustrated in the controller shown in the accompanying drawings and which is designed to control various mechanisms at each feed of a six-feed circular knitting machine.

Figure 7:
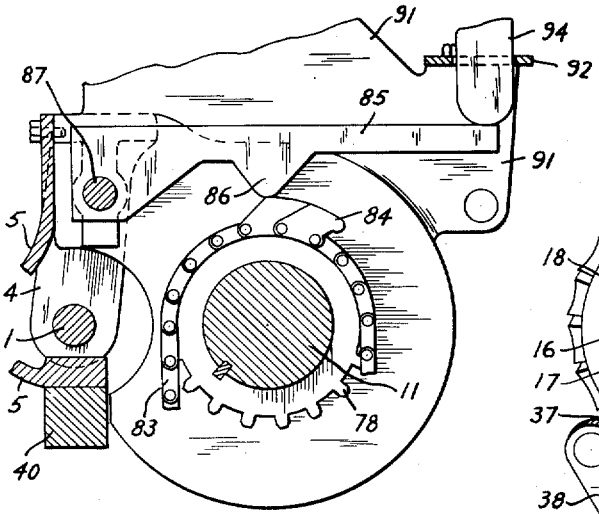
Figure 6:
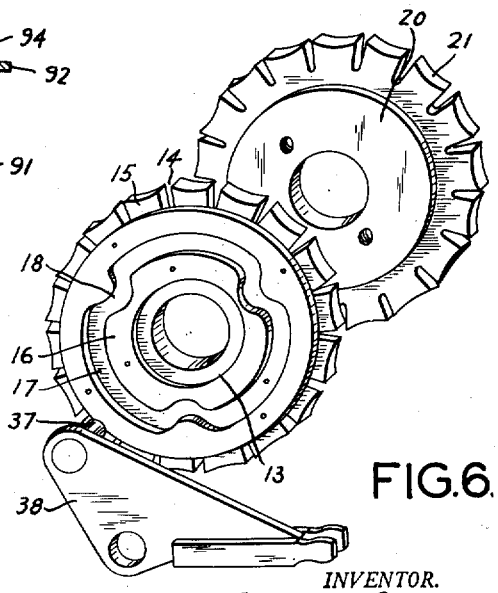
Figure 3:
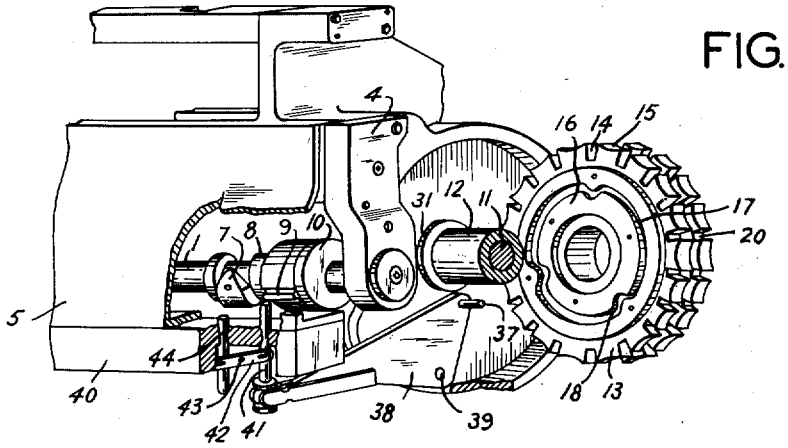
Figure 2:
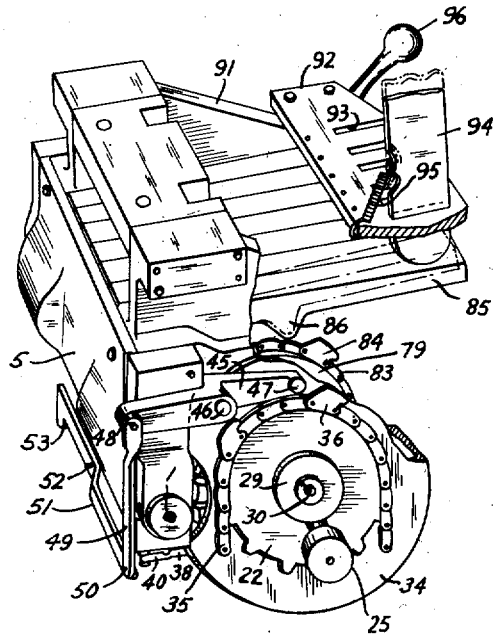
Figure 8:
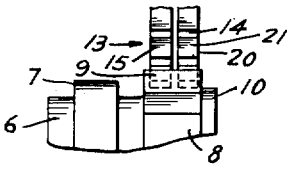
Figure 9:
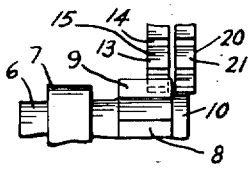
Figure 4:
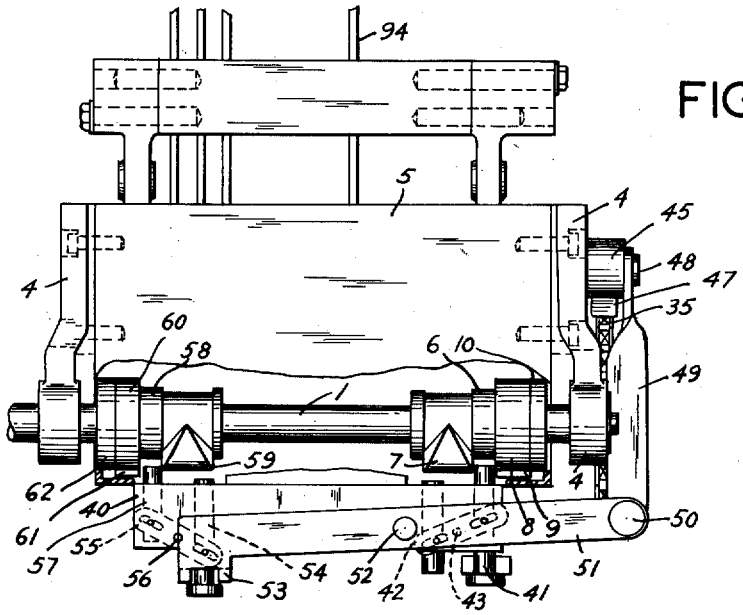
Figure 5:
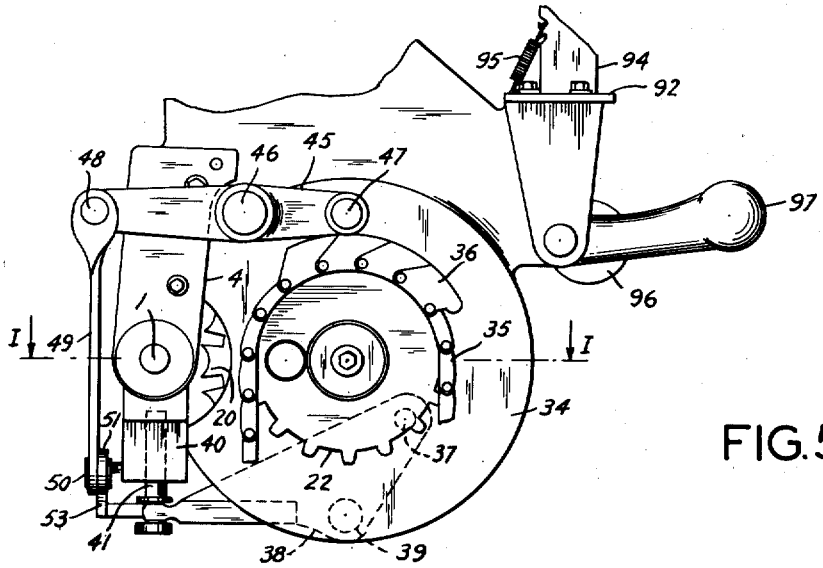

In the drawings, Fig. 1 is a horizontal section of the controller including its master control mechanism, about on the line I—I of Fig. 5. Fig. 2 is an isometric projection of the same in its housing. Fig. 3 shows the controller housing broken away at the master control mechanism and the Geneva wheels removed from their hub and turned outwardly. Fig. 4 is a side elevation of the controller with a part of the housing broken away. Fig. 5 is an end elevation of the master control device. Fig. 6 is an exploded view showing the two Geneva wheels as viewed from their inner sides and with the follower arm that is actuated by one of them to advance the master control pattern at the end of each complete cycle of the knitting machine. Fig. 7 is a section showing one of the change directing patterns and its associated mechanism. Fig. 8 is a detail showing the driving gear in position for turning both of the master control Geneva wheels. Fig. 9 is a detail showing the same gear in position for turning only the inner master control Geneva wheel and locking of the outer or second master control Geneva wheel against turning the master control sprocket wheel.

Referring to the drawings, the shaft 1 of the controller, driven continuously from the main shaft of the knitting machine (not shown) through gears 2, is supported in bearings 3 in brackets 4 connected to the housing 5 of the controller. Since this controller is designed for a six-feed knitting machine wherein all changes in operation are to be made at one and the same place with respect to the needle cylinder, the shaft 1 is assumed to rotate once for each pass of a feed over that place. Affixed to shaft 1 by a key so that it will be turned with the shaft and at the same time be slidable axially thereon, is the sleeve 6 which toward its left hand end has the cam 7 having a pointed end (Fig. 4) and which at its right hand end has a gear 8 provided with the single gear tooth 9 and a cylindrical portion that may be formed by a collar 10. Except for the projecting tooth 9 and the necessary slots at its two sides, the gear 8 is cylindrical and of the same diameter as 10.

Forwardly of shaft 1 and also supported in bearings in housing 5 is another shaft 11 on which is carried a hub 12 rotatable thereon. On the hub 12, in turn, is loosely carried the driven member or inner Geneva wheel 13 so positioned that it can be turned by the tooth 9 on the gear 8 as the tooth engages successively in each of the slots 14 between the teeth 15 of the wheel. The concaves at the ends of the teeth 15 are such that they lock with 8. On the inner face of the Geneva wheel 13 is a circular channel or groove 17 provided with a number of eccentric portions 18, in the present instance three, equiangularly spaced, and correspondingly, since the knitting machine for which this controller was designed is a six-feed machine. The wheel 13 has eighteen teeth 15 (Fig. 6). The groove 17 may be provided by concentric applied rings 16.

Also carried on the hub 12 but fastened thereto, as by screws 19, is the drivable member or outer Geneva wheel 20. This has the same diameter as Geneva wheel 13, and the same number of like teeth, and is positioned next to 13 so that the concave end of each of its teeth 21 can engage and lock with the collar 10 of gear 8 when the sleeve 6 is slid to the left on shaft 1 (Fig. 9) and be turned by the single tooth 9 on the gear 8 when the sleeve 6 is slid to the right (Fig. 8). Additionally carried on the hub 12 is the sprocket 22 which is furnished, off its center, with the sleeve 23 containing a sliding pin 24 having a head 25; a spring 27, bearing on the opposite end 26 of the pin, tends to thrust this end of the pin into any one of the series of holes 28 in the hub and thereby lock the sprocket 22 to the hub in whatever angular position the desired timing may require. The hub 12 is held on the shaft 11 by a disk 29 and screw 30. An annular disc 31, fastened to the adjacent end wall 32 of the controller casing by pins 33 and located between hub 12 and a sleeve fastened on the shaft 11, serves to confine the shaft rotatably mounted in the wall 32. A cover plate 34 covers the Geneva wheels 13 and 20. An endless chain 35, provided with high links 36 at such places as will bring the change-directing patterns into action at the desired times as will be understood, constitute the pattern of the master control mechanism. It is mounted on the sprocket 22.

An actuator or lever 38 carries a follower pin 37 to run in the groove 17 of the Geneva wheel 13. It is pivoted at 39 to the housing and its opposite end extends underneath the beam or housing frame member 40 which is located below the shaft 1 (Fig. 3). A sliding pin 41 is mounted in the beam 40 and connected to the outer end of the actuator or lever 38. Also by the slotted link 42 which turns on the pivot pin 43 secured to the beam 40, the sliding pin 41 is connected to a second sliding pin 44 also located in the beam 40. The upper end of the pin 41 is positioned to be engaged by the right hand side of the cam 7, Fig. 3, when that cam 7 is turned and thereby slide the sleeve 6 to the left. Similarly, the upper end of the pin 44 is engageable by the left hand side of the cam 7 to move the sleeve 6 to the right. The arrangement is such of course that only one pin at a time can be projected to a position where it can be engaged by the cam 7.

In brief, the Geneva wheels 13 and 20 constitute successive gears for driving the master control pattern 35 from the main shaft of the machine quite slowly. Also the Geneva wheels 13 and 20, cooperating through the lever 38 and its associated mechanism to the end that the Geneva wheel 20 is brought into action only once in a complete cycle of the knitting machine (i. e. the passage of six feeds over a given point), serve to time the advances of the master control mechanism pattern with respect to complete cycles.

The mechanism directly connecting the master chain 35 to the carriers of the change-directing patterns and by means of which the master control mechanism, acting through the master chain 35, brings those patterns into and takes them out of operation, is as follows: A feeler arm 45, turning on pivot 46 secured to the housing 5 just forward of the bracket 4, rests, at its follower roller 47 which constitutes its feeler, upon the master control chain 35 (Figs. 2 and 5). The opposite end 48 of the feeler arm 45 is hinged to the upper end of a vertical link 49 which, in turn, is hinged at 50 to a lever 51 extending for nearly all of the length of and outside the beam 40. This lever 51 turns on pivot pin 52 secured to the beam 40, and its left hand end, as viewed in Fig. 4, is shaped so as to form a bracket 53 extending under the beam 40. Connected to the bracket 53, and extending through the beam 40, is the sliding pin 54, and a slotted link 55, which turns on the pivot 56 secured to the beam 40, connects this pin 54 to a second parallel sliding pin 57 also mounted in the beam 40. Above the vertical pins 54 and 57 and slidably keyed on the shaft 1 in the same manner as sleeve 6, is the sleeve 58 which toward its right hand end carries the pointed cam 59 and which at its left hand end carries the gear 60 provided with the single tooth 61 and has a cylindrical portion 62 that again may be provided by a separate collar. Like the gear 8, the gear 60 is cylindrical except at and adjacent its tooth 61, and its cylindrical diameter is equal to the diameter at 62. The upper end of the sliding pin 54 is so located that, when projected, it is engageable by the right hand side of the cam 59, as viewed in Fig. 3, when the cam 59 is turned, and thereby can shift the sleeve 58 to the left. Similarly the upper end of the sliding pin 57 is engageable, when projected, by the left hand side of the cam 59, and thus can shift the sleeve 58 to the right. The interconnecting link 55 permits only one of these pins to be projected at a time, of course.

On the left end of the shaft 11, as viewed in Fig. 1, is mounted a hub 63 which is held on the shaft against axial movement outwardly and also against rotation on the shaft by the disk 64 and screw 65. On the hub 63, in turn, and free to turn thereon, is carried a Geneva wheel 66 so positioned that the concave end of one of its teeth 67 will be engaged and locked by the collar 62 of gear 60 when the sleeve 58 is slid to the right on the shaft 1, and also so positioned that it may be turned by the single tooth 61 on the gear 60 successively engaging the slots between its teeth 67 when the sleeve 60 is slid to the left. The hub 63 is held against axial movement inwardly by the disk 68 or the adjacent end wall 69 of the controller housing on which 68 is fastened by the pin 70. The wall 69 has a plate 71 to cover the Geneva wheel 66. The hub 63 is provided with a sleeve 72 in which is a pin 73 having the head 74, and also a spring 76 positioned between the inner shoulder of the sleeve 72 and the end 75 of the pin 73, and which therefore serves to hold the pin 73 projected into whichever of the series of holes 77 in the Geneva wheel 66 it may be inserted. By this arrangement the hub 63, and thereby the shaft 11 which carries the change-directing pattern as later appears, are locked to, but are angularly adjustable for timing relative to, the Geneva wheel or gear 66.

The controller mechanism includes a plurality of sprockets 78 each keyed to the shaft 11 so that it will turn therewith, and held against axial movement at the right, as viewed in Fig. 1, by the disk 79 and screws 80 and at the left by the disk 81 and the screws 82. The disks 79 and 81 may engage the end walls 32 and 69. Carried on each sprocket 78 is a change-directing pattern consisting of an endless chain 83 having high links 84 located at intervals appropriate to the changes the particular chain is to bring about, as will be understood. Also included in the controller mechanism is a plurality of feelers in the form of levers 85 (Figs. 2 and 7), each of which extends over a controller chain 83 on a sprocket 78 and is provided with a nose 86 resting on its chain 83, and each of which is pivoted on a bar 87 carried on the housing. At the free ends of the feeler levers 85, side panels 91 extending from the ends 32 and 69 of the housing 5 support a comb bar 92, and in the slots 93 of the comb bar 92 are supported bars or levers 94 which transmit the calls on the feelers 85 to devices which exercise the control, not shown. The transmitting bars or levers 94 may be held to the feelers 85 by springs 95. An eccentric 96, manually actuatable by the handle 97, serves to raise the feelers from the patterns 83 when these patterns are to be changed.

The operation of the controller described is as follows: The shaft 1, driven continuously in a clockwise direction (Fig. 3) by gears 2 from the main shaft, completes one rotation each time one of the six feeds of the circular knitting machine it controls passes some point, say the location of the call-transmitting bars 94. With each rotation the tooth 9 on the gear 8 engages a slot 14 between two teeth 15 on the Geneva wheel 13 and advances this Geneva wheel one step. While the Geneva wheel 13 is being advanced about six steps, the pin 37 on the actuator or lever 38 rides in a concentric part of the groove 17 in the Geneva wheel 13 so that this pin is held away from the shaft 11, and accordingly the opposite end of the arm 38 holds the pin 41 raised in the path of the cam 7. As a result the sleeve 6 is held to the left by this pin, as viewed in Figs. 1 and 3, and the tooth 9 can turn only Geneva wheel 13. The collar 10 then engages the concave end of one of the teeth 21 on the Geneva wheel 20 and holds that wheel locked against rotation (see Fig. 9).

At the close of these step-by-step turns of the Geneva wheel 13, that is, while the sixth turn is being completed, the pin 37 enters one of the eccentric portions 18 in the groove 17 and the arm 38 is turned backward around its pivot 39. Consequently the free end of the arm 38 is depressed and with it the pin 41 is lowered and removed from the path of the cam 7 while at the same time the vertical pin 44 is thrust into the path of that cam. Thereby when the continued rotation of the sleeve 6 brings the cam 7 against the pin 44, the sleeve 6, and with it the gear 8, are slid to the right so that the collar 10 is slid to the right out of its locking engagement with the tooth 21 on the Geneva wheel 20 and the tooth 9 is moved into position to engage that Geneva wheel. A moment later accordingly both Geneva wheels 13 and 20 are turned simultaneously (on the seventh turn of Geneva wheel 13) one notch by the tooth 9. Since the Geneva wheel 20 is fastened to the hub 12 and the sprocket 22 is also fastened to the hub 12, this turn of the Geneva wheel 20 also turns the master control sprocket 22 one interval, and with it, of course, advances the master control pattern chain 35 carried thereon.

During this time the sliding pin 57 at the opposite end of the controller has held the sleeve 58 to the right, thereby locking the controller Geneva 66 against movement and therewith the change-directing patterns on the sprockets 78. Suppposing that the single turn of the sprocket 22 mentioned above does not bring one of the high links 36 on the master control pattern chain 35 under the roller 47, Fig. 2, everything continues as before until a later turn of the sprocket 22 brings a high link under the roller, Fig. 5. Such an action calls the change-directing patterns to advance, and whenever it occurs the feeler arm 45 is thereby raised and its other end is lowered and depresses the right hand end of the cross arm 51. The left hand end of the cross arm 51 is accordingly raised, and removes sliding pin 57 from action thrusts sliding pin 54 into the path of cam 59. Shortly thereafter the continued rotation of the sleeve 58 brings the cam 59 against the pin 54, and thereby the sleeve 58 and with it the gear 60 are slid to the left so that the collar 62 is moved to the left out of its locking engagement with concave end of a tooth 67 on the Geneva wheel 66 and the tooth 61 on the gear 60 is moved into position to engage with that Geneva wheel, so that a moment later Geneva 66 is turned one notch by the tooth 61. Since the Geneva wheel 66 is fastened as above described to the hub 63 and the hub 63 is secured to the shaft 11, and the controller sprockets 78 also are secured to the shaft 11, this turn of the Geneva wheel 66 also turns the controller sprockets 78 an interval and advances the change-directing patterns 83 one step. Wherever this brings a high link 84 on a controller chain 83 to its feeler 85, this feeler is raised by the link (or is held up if already raised) and with it the corresponding bar 94 is actuated to, say, make a change at some cam, yarn changer, or other element of the knitting machine.

During the completion of the turn in which the tooth 9 turns both Geneva wheels 13 and 20, the pin 37 rides out of the eccentric portion 19 and into the next concentric portion of the groove 17. This turns arm 38 back around the pivot 39 and thus raises the end of arm 38 and with it raises the sliding pin 41 and withdraws the sliding pin 44. Since the pin 41 is now in the path of the cam 7, sleeve 6 soon is moved to the left to slide the gear tooth 9 out of reach of the Geneva wheel 20 and place the collar 10 again into engagement with the concave end of a tooth 21 on Geneva wheel 20 to again lock that wheel against rotation. As a result, on the eighth and the next few turns, tooth 9 turns only the Geneva wheel 13. However, Geneva wheel 20 and therewith the master controller pattern 35 are locked in position during this eighth and the next few turns, and no change is made in the positions of the sliding pins 54 and 57 during this period. If there is a low link of the master controller pattern 35 below the follower 47, the sprockets 78 and their change-directing patterns 83 remain at rest. On the other hand, if there is a high link of chain 35 below follower 47 during this period, the change-directing patterns 83 are advanced six times during the period so that changes can be made or omitted at each feed individually as desired.

In brief, because of the use of a succession of gears (here two Geneva movements) at the master control mechanism, the master control pattern is advanced relatively slowly, and accordingly may be rather short. Further, the relations between these gears cause this pattern to advance in a time relation to complete cycles of the controlled machine, namely in the present instance, advance once for each complete cycle. At each advance this control pattern either directs that the change-directing patterns remain at rest during the next complete cycle of the machine it controls, or advance during that cycle so that as many of the operations composing the complete cycle may be changed as desired during that period. At the same time, because of the use of gear-type mechanism at the master control as well as for advancing the change-directing patterns, the change-directing patterns are advanceable only by, and in accordance with the timing of, the controller driving shaft 1, except as the timing may be changed deliberately by the manipulation of the adjustment permitting devices 24 and 75, so that the controller, once properly adjusted, is substantially proof against accidental mistiming. Thus it will be apparent that except as parts may be unlocked from each other by deliberate manipulation of the adjustment devices 24 and 75, the Genevas 13 and 20 are locked at rest at all times except while being turned by the single tooth gear 8 and therewith the master control pattern 35 is locked at rest, and the change-directing patterns likewise are locked in rest positions at all times except when being advanced by the single tooth gear 60; and even while being advanced all these parts are locked to the primary driving shaft 1, directly or indirectly.

It will be understood of course that my invention is not limited to the details of construction and operation illustrated in the drawing and described above, except as appears hereafter in the claims. It is to be understood also that I do not intend the claims to be limited wholly to the particular elements specifically mentioned in them, but to include equivalents of those elements as well.

I claim:

[1. In a controller, at least one change-directing pattern, a master control mechanism having a pattern to direct the advances of said change-directing pattern, a power device to advance said master control pattern and said change-directing pattern, constantly intermeshed toothed gearing between said power device and said master control pattern through which the latter is driven from the former, and constantly intermeshed toothed gearing between said power device and said change-directing pattern through which the change-directing pattern is driven by the power device.]

[2. In a controller, at least one change-directing pattern, a master control mechanism having a pattern to direct the advances of said change-directing pattern, a shaft to be driven in a fixed time relation with the apparatus subject to the controller, a Geneva type of movement between said master control pattern and said shaft through which the master control pattern is advanced and is locked in position during the intervals between advances by said shaft, and constantly intermeshed toothed gearing between said shaft and said change-directing pattern through which the change-directing pattern is advanced when called by the master control pattern.]

[3. In a controller, at least one change-directing pattern, a master control mechanism having a pattern to direct the advances of said change-directing pattern, a shaft to be driven in a fixed time relation with the apparatus subject to the controller, a Geneva type of movement between said master control pattern and said shaft through which the master control pattern is advanced and is locked in position during the intervals between advances by said shaft, a Geneva type movement between said change-directing pattern and the shaft through which the change-directing pattern is advanced and is locked in position during the intervals between advances by the shaft, and a coupler between the last mentioned Geneva movement and said master control pattern through which the master control pattern actuates the said Geneva movement to cause the change-directing pattern to advance.]

[4. The subject matter of claim 2, characterized by the fact that at least two Geneva type movements are interposed between said master control pattern and said shaft, one being coupled to the movement ahead of it for actuation thereby so as to advance at intervals, and the last being coupled to said master control pattern to advance the latter.]

5. In a controller, at least one change-directing pattern, a master control pattern to direct the advance of said change-directing pattern, a shaft to be driven in a fixed time relation with the apparatus subject to the controller, a Geneva type of movement driven by said shaft, a second Geneva type of movement the driven member of which is attached to said master control pattern and the driving member of which includes a sleeve rotatable by but slidable on said shaft between locking and driving position, and an actuator controlled by the first mentioned Geneva movement to slide said sleeve along the shaft.

*6. In a controller, at least one change-directing pattern, a master control mechanism having a pattern to direct the advance of said change-directing pattern, a shaft to be driven in a fixed time relation with the apparatus subject to the controller to advance said master control pattern and said change-directing pattern, constantly intermeshed toothed gearing between said master control pattern and said shaft through which said master control pattern is driven, and constantly intermeshed toothed gearing, at least one element of which is slidable on said shaft, through which said change-directing pattern is driven by said shaft.*

*7. The subject matter of claim 6, characterized by the fact that the constantly intermeshed gearing between said master control pattern and said shaft, is a Geneva type gear.*

*8. The subject matter of claim 7, characterized by the fact that the element which is slidable on said shaft is a sleeve which is slidable to and from positions where, alternately, it advances a change-directing pattern and locks said pattern in position, and an actuator is provided, controlled by said master control pattern, to control such sliding of the sleeve.*

*9. The subject matter of claim 8, characterized by the fact that the gearing through which the change-directing pattern is driven is a Geneva type movement.*

*10. The subject matter of claim 6, characterized by the fact that the constantly intermeshed gearing through which the change-directing pattern is driven, is a Geneva type gear, the toothed gear which drives the Geneva wheel thereof is the element which is slidably mounted on said shaft, and an actuator, controlled by the master pattern, is provided to control the position of the toothed gear along the shaft.*

*11. In a controller, at least one change-directing pattern, a master-control mechanism having a pattern to direct the advances of said change-directing pattern, a shaft to be driven in a fixed time relation with the apparatus subject to the controller, at least two Geneva type movements interposed between said master control pattern and said shaft through which the master control pattern is advanced and locked in position during intervals between advances by said shaft, one of said Geneva type movements being coupled to the movement ahead of it for actuation thereby so as to advance at intervals, and the last being coupled to said master control pattern to advance the latter, and constantly intermeshed toothed gearing between said shaft and said change-directing pattern through which the change-directing pattern is advanced when called by the master control pattern.*

*12. The subject matter of claim 11, characterized by the fact that at least one element of said toothed gearing includes a sleeve rotatable by but slidable on said shaft through which said change-directing pattern is driven by said shaft.*

*13. The subject matter of claim 12, characterized by the fact that said toothed gearing is a Geneva type movement, and an actuator is provided controlled by the master control pattern to slide said sleeve of the Geneva type movement.*

CHARLES F. MILLER.

REFERENCES CITED

The following references are of record in the file of this patent or the original patent:

UNITED STATES PATENTS

| Number | Name | Date |
|---|---|---|
| 2,082,127 | Sirmay | June 1, 1937 |

FOREIGN PATENTS

| Number | Country | Date |
|---|---|---|
| 424,298 | Great Britain | Feb. 19, 1935 |